(12) United States Patent
Vandenabeele et al.

(10) Patent No.: US 6,694,516 B1
(45) Date of Patent: Feb. 17, 2004

(54) METHOD USED IN A TELECOMMUNICATION NETWORK, TERMINATION UNIT REALIZING THE LATTER AND A TELECOMMUNICATION NETWORK INCLUDING SUCH A TERMINATION UNIT

(75) Inventors: Peter Vandenabeele, Lier (BE); Dieter Beller, Korntal-Munchingen (DE)

(73) Assignee: Alcatel Alsthom Compagnie Generale d'Electricite, Paris (FR)

( * ) Notice: Subject to any disclaimer, the term of this patent is extended or adjusted under 35 U.S.C. 154(b) by 0 days.

(21) Appl. No.: 08/970,245

(22) Filed: Nov. 13, 1997

(30) Foreign Application Priority Data

Nov. 13, 1996 (EP) .............................. 96402417

(51) Int. Cl.$^7$ ............................. H04N 7/14; H04N 7/10; H04N 7/16
(52) U.S. Cl. ...................... 725/121; 725/126; 725/130; 725/131; 725/107
(58) Field of Search ................................. 725/131, 134, 725/148–151, 126–128, 63–72, 74–81

(56) References Cited

U.S. PATENT DOCUMENTS

| | | | | |
|---|---|---|---|---|
| 3,835,393 A | | 9/1974 | Marron ........................ | 325/308 |
| 4,752,954 A | * | 6/1988 | Masuko ....................... | 725/130 |
| 5,361,394 A | * | 11/1994 | Shigihara .................... | 725/131 |
| 5,606,725 A | * | 2/1997 | Hart ............................ | 455/5.1 |
| 5,835,844 A | * | 11/1998 | Stoneback et al. .......... | 725/125 |
| 5,883,677 A | * | 3/1999 | Hofmann .................... | 348/906 |
| 5,901,340 A | * | 5/1999 | Flickinger et al. ........... | 455/3.1 |

FOREIGN PATENT DOCUMENTS

WO      9608925      3/1996

OTHER PUBLICATIONS

"CATV Return Path Characterization for Reliable Communications", C. Eldering et al, *IEEE Communications Magazine*, Aug. 1995, pp. 62–69.

"Designing the Return System for full Digital Services", D. Stoneback et al, *Proceedings of the Society of Cable Telecommunications Engineers 1996 Conference on Emerging Technologies*, Jan. 8–10, 1996, San Francisco, pp. 269–277.

W. Sinnema, "Digital, Analog, and Data Communication, Second Ed." Prentice–Hall Inc., Englewood Cliffs NJ, 1986, pp. 91–95 and 115–117.

* cited by examiner

*Primary Examiner*—Andrew Faile
*Assistant Examiner*—Reuben M. Brown
(74) *Attorney, Agent, or Firm*—Ware, Fressola VanDer Sluys & Adolphson LLP

(57) ABSTRACT

The method is used in a telecommunication network wherein a central station (CS) is coupled to a plurality of residences (R1,R2,R3). One of the residences (R3) includes a termination unit (TU) which is coupled to the central station (CS) via a first port (P1). The residence (R3) also includes subscriber terminals, e.g. a personal computer (PC), a telephone set (TEL), a television set (TV) and a set-top box (STB) which are coupled to the termination unit (TU) via a second port (P2). The method includes amplifying an upstream signal (US) applied to the second port (P2) with an upstream gain value (UG) by means of an upstream signal amplifier (U-AMP3) which is included in the termination unit (TU). Thereby, an amplified upstream signal (AUS) is generated and provided to the first port (P1). The upstream gain (UG) is a compensation for the signal power attenuation of the internal transmission line (UA-Li) between the termination unit (TU) and one of the subscriber terminals which is in fact the in-house network attenuation. By this way cross-talk in the region of the internal transmission line at the subscriber terminals is reduced by reducing the differences between the signal power levels.

13 Claims, 1 Drawing Sheet

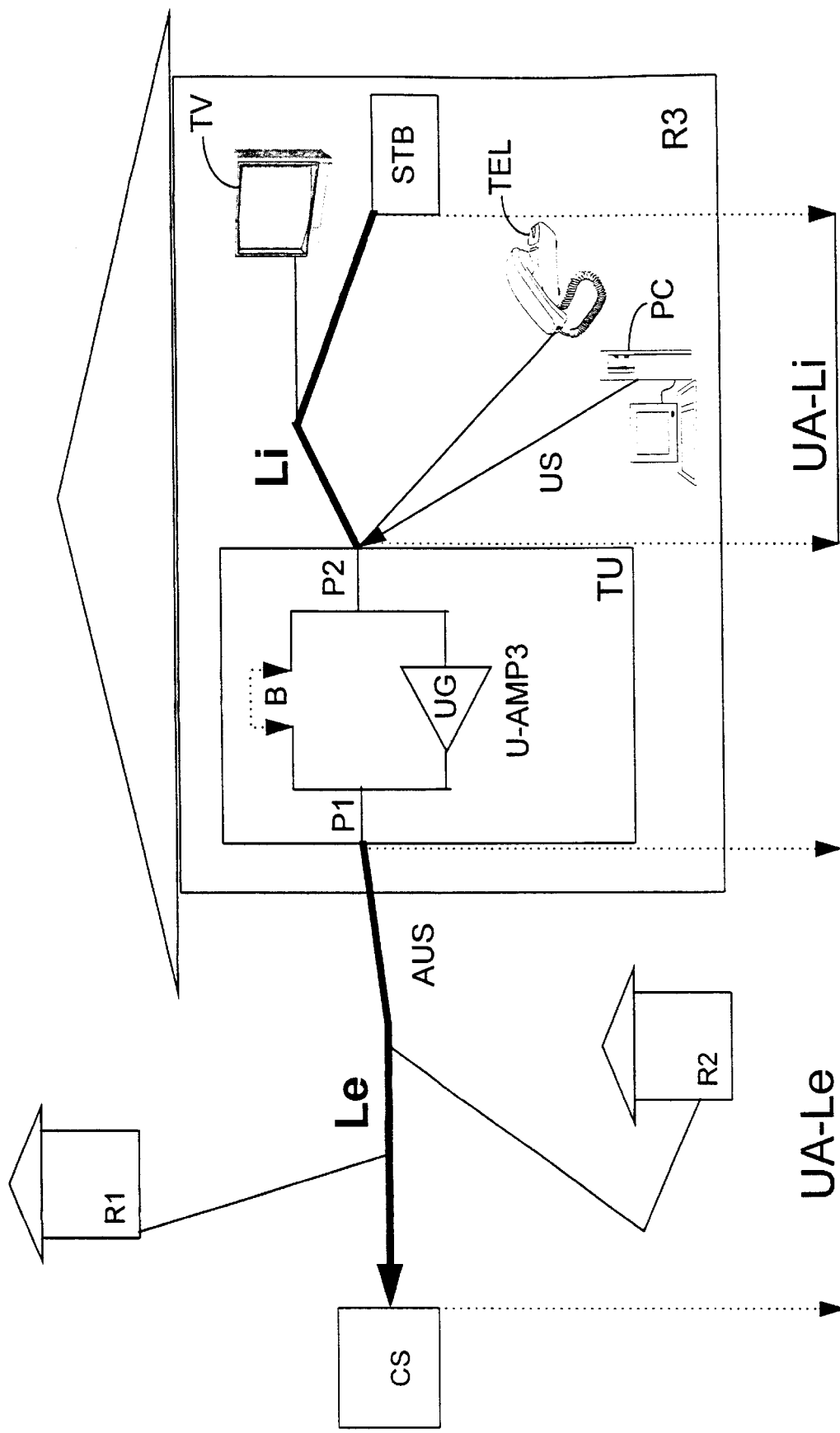

METHOD USED IN A TELECOMMUNICATION NETWORK, TERMINATION UNIT REALIZING THE LATTER AND A TELECOMMUNICATION NETWORK INCLUDING SUCH A TERMINATION UNIT

BACKGROUND OF THE INVENTION

1. Technical Field

The present invention relates to a method used in a telecommunication network, a termination unit realizing the latter, and a telecommunication network including such a termination unit.

2. Discussion of Related Art

Such a termination unit is already known in the art, e.g. from the article "CATV Return Path Characterization for Reliable Communications" of Charles A. Eldering, Nageen Himayat and Floyd M. Gardner, published in the IEEE communications Magazine of August 1995 from page 62 to page 69. As described in the abstract of the article, there is a tremendous need for equipment to support bidirectional communications over a hybrid fiber coax HFC network shown on FIG. 1 of page 63. The HFC network is a tree branch network emanating from a central office and terminating at the subscriber residences in termination units which are called in the article coaxial termination units. Additional splitting of the downstream signal takes place in the residences in order to terminate in the subscriber terminals, e.g. personal computer, videophone, set-top box and TV.

It has to be remarked that the signal power attenuation of a transmission line between two points refers in this invention to the global attenuation of the transmission line taking into account the following parameters:

the attenuation of the transmission line proportional to the distance and the number of splittings along the line between the two points; and the included amplifiers along the transmission line between the two points in the transmission direction.

A portion of the downstream signal power is provided to each subscriber terminal. Due to the attenuation along the network links, i.e. external signal power attenuation, and the attenuation of the growing in-house network in the residences, i.e. internal signal power attenuation, the portion of the power level of the downstream signal received in each of the subscriber terminals becomes low compared with the power level of the upstream signal generated by the subscriber terminal. This difference in power level makes the region of the internal network near the subscriber terminal very sensitive to cross-talk which influences the downstream signal.

This phenomenon is described in the book "Digital, Analog, and Data Communication, Second Edition" of William Sinnema with reference number ISBN 0-8359-1313-9, published in 1986 by Prentice-Hall, Inc., a division of Simon & Schuster, Englewood Cliffs, N.J. 07632, and more particularly on pages 115 to 117 thereof. On page 115 cross-talk is defined as induced signals into neighbouring pairs by either capacitive or inductive coupling because of the close proximity of adjacent wire pairs in a cable. As described on page 116 the crosstalk can be reduced by physically separating the downstream and upstream signals with a screened cable e.g. coaxial cable.

SUMMARY OF THE INVENTION

An object of the present invention is to provide a termination unit such as the above known ones but which is suited to further reduce the cross-talk in the region of the internal transmission line at the subscriber terminal.

According to a first aspect of the present invention, a method for use in a telecommunication network wherein a central station is coupled to a plurality of residences, one of said residences including a termination unit coupled to said central station via a first port, said residence including at least one subscriber terminal coupled to said termination unit via a second port, is characterized in that said method includes the steps of amplifying an upstream signal applied to said second port with an upstream gain value by means of an upstream signal amplifier included in said termination unit and generating an amplified upstream signal provided to said first port and that said upstream gain value is for compensating any of an upstream signal power attenuation of an internal transmission line coupled between said termination unit and any of said subscriber terminals, and a downstream signal power attenuation of said internal transmission line.

According to a second aspect of the present invention, a method for use in a telecommunication network wherein a central station is coupled to a plurality of residences, one of said residences including a termination unit coupled to said central station via a first port, said residence including at least one subscriber terminal coupled to said termination unit via a second port, is characterized in that said method includes the steps of amplifying a downstream signal applied to said first port with a downstream gain value by means of a downstream signal amplifier included in said termination unit and generating an amplified downstream-signal provided to said second port and that said downstream gain value is for compensating any of an upstream signal power attenuation of the internal transmission line coupled between said termination unit and any of said subscriber terminals, and a downstream signal power attenuation of said internal transmission line.

According to a third aspect of the present invention, a termination unit for inclusion in a telecommunication network wherein a central station is coupled to a plurality of residences, one of said residences including said termination unit coupled to said central station via a first port of said termination unit, said residence including at least one subscriber terminal coupled to said termination unit via a second port, is characterized in that said termination unit includes an upstream signal amplifier to amplify an upstream signal applied to said second port with an upstream gain value and to thereby generate an amplified upstream signal provided to said first port and that said downstream gain value compensates any of the upstream signal power attenuation of the internal transmission line coupled between said termination unit and any of said subscriber terminals, and the downstream signal power attenuation of said internal transmission line.

According to a fourth aspect of the present invention, a telecommunication network is characterized in that said telecommunication network includes at least one termination unit according to the third aspect of the present invention.

By including an upstream signal amplifier in the termination unit to amplify the upstream signal, according to the first, second and third aspects of the present invention, the required power level of the upstream signal generated by the subscriber terminal is allowed to be smaller.

Indeed, the subscriber terminal sends a less powerful upstream signal which is amplified in the termination unit in order to receive there the required powerbudget needed for a signal to be transmitted from the residence to the central station. The upstream gain value of the upstream signal amplifier is in fact a compensation for the upstream signal power attenuation of the internal transmission line coupled between the subscriber terminal and the termination unit.

In this way, at the region of the internal transmission line at the subscriber terminal, the difference in power level of the received downstream signal and of the transmitted upstream signal is smaller which makes this region less sensitive to cross-talk.

It also has to be remarked that in a totally symmetrical network the attenuation in upstream and downstream direction is identical, however e.g. the usable downstream and upstream frequency band for transmission in HFC networks are not the same. This makes for a situation in which the equipment to support bi-directional transmission e.g. the position of taps along the transmission line are optimized in one direction but not necessarily in the other direction. The following article, dealing with this problem can be mentioned as technical background: "Designing the Return System for Full Digital Services" written by Dean A. Stoneback and William F. Beck and published in the proceedings manual of "1996 Conference on Emerging Technologies, Jan. 8–10, 1996, San Francisco Hilton and Towers", by the Society of Cable Telecommunications Engineers, 140 Philips Road, Exton Pa. 19341-1318, (610) 363–6888, more particularly from pages 269–277. This is a reason why a distinction is made between upstream signal power attenuation and downstream signal power attenuation of the same transmission line. However, in order no to overload this introduction, the arguments are sometimes described for only one transmission direction or without specifying the transmission direction.

By including a signal amplifier in the termination unit to amplify the downstream signal, in further accord with the first, second and third aspects of the present invention, the power level of the received downstream signal is bigger at the subscriber terminal, which also makes the difference in power level of the received downstream signal and of the transmitted upstream signal smaller and the region becomes less sensitive to cross-talk.

The downstream gain value of the downstream signal amplifier is in fact a compensation for the downstream signal power attenuation of the internal transmission line coupled between the termination unit and the subscriber terminal.

A possible implementation of the first aspect of the present invention is that the gain of the amplifiers included in the termination unit is a function of:
 the upstream signal power attenuation of the external transmission line coupled between the termination unit of the residence and the central station; or
 the downstream signal power attenuation of the external transmission line.

An important advantage becomes clear with this feature. Indeed, the subscriber terminals are designed to be able to transmit an upstream signal to the central station with a certain power budget within a predetermined power level range in order to overcome the internal and external signal power attenuation along the transmission path from the subscriber terminal to the central station. The power level of an upstream signal received at the central station will become too low in the event that the total end-to-end signal power attenuation exceeds a maximum allowed signal power attenuation, i.e. each time the signal power attenuation of the external transmission line plus the signal power attenuation of the internal transmission line exceeds a maximum allowed signal power attenuation. This maximum allowed signal power attenuation is the signal power attenuation according to the upper limit of the predetermined power level range as described above.

Each time a new subscriber terminal is installed in the residence, the internal signal power attenuation should be determined again. Therefore a maximum expected internal signal power attenuation of an internal transmission line is defined and it can be made a requirement or rule that it may not be exceeded. This ensures that in order to respect the above requirement only the signal power attenuation of the external transmission line has to be taken into account. When the residence is located in the telecommunication network at a place where the external signal power attenuation is small, the above requirement is respected and there will be no receiving problem in the central station. However, when the residence is located in the telecommunication network at a place where the external signal power attenuation is big, the above requirement cannot be respected anymore.

By introducing the signal amplifier of the invention and by making the gain of the signal amplifier in the termination unit a function of the signal power attenuation of the external transmission line, the above requirement can again be respected.

Indeed, the extra power budget needed to overcome the signal power attenuation of the end-to-end transmission line is provided by the signal amplifier included in the termination unit.

It has to be remarked here that the decision to implement at the residence a termination unit according to the present invention and to activate the signal amplifier, depends on the quality of the end-to-end network. Indeed, once the external signal power attenuation exceeds the difference between the maximum allowed external signal power attenuation and the maximum gain value introduced by the signal amplifier, the power budget of the signal should be increased in order to have a power budget within the predetermined power level range of above. This is realized with the gain of the signal amplifier of the termination unit of the present invention.

Yet, a further characteristic feature of the first and second aspects of the present invention is that the upstream or downstream signal amplifier are controlled via control signals of a control unit. This feature corresponds to the fact that controllable gains of the amplifiers are an advantage for picking up changes in the level of the signal power attenuation of the external transmission line.

In a further implementation of the first aspect of the present invention, the signal power attenuation of the external transmission line is determined at set times whereby the value is provided to the control unit in order to determine the control signal of the downstream or upstream amplifier. In this way a remote automatic control system can be realized by using the method of the invention.

An application of the termination unit according to the second aspect of the present invention is a telecommunication network, according to the fourth aspect of the present invention, which includes at least one subscriber residence which includes a termination unit according to the third aspect of the present invention.

These and other objects, features and advantages of the present invention will become more apparent in light of the detailed description of a best mode embodiment thereof, as illustrated in the accompanying drawing.

BRIEF DESCRIPTION OF THE DRAWING

The accompanying sole figure represents a general functional block diagram of an embodiment of a telecommunication network which includes a termination unit according to the present invention.

DETAILED DESCRIPTION OF PREFERRED EMBODIMENTS

The working of the telecommunication network regarding the invention and shown in the sole figure will be explained by means of a functional description of the different blocks as shown therein. Based on this description, the practical implementation of the blocks will be obvious for a person skilled in the art.

The telecommunication network is a tree branch network emanating from a central station CS and terminating at the subscriber residences R1, R2 and R3. In this way, the central station CS is coupled to the termination unit TU included in the subscriber residence R3 via the first port P1.

Additional splitting of the downstream signal takes place in the residences R1, R2 and R3. In this way the termination unit TU included in the subscriber residence R3 is coupled to the subscriber terminals included in the subscriber residence R3 via the second port P2 e.g. a personal computer PC, a telephone set TEL, a television set TV and set-top box STB.

It has to be remarked that in order to be able to further process the received downstream signal some subscriber terminals should include a modem i.e. the telephone set TEL and the personal computer PC. Since these modems go beyond the scope of the invention, they are not shown in the figure.

In order not to overload the figure only the subscriber terminals of the subscriber residence R3 are shown.

The termination unit TU of residence R3 includes an upstream amplifier U-AMP3 and a bridge B which are both coupled between the first port P1 and the second port P2.

To explain the working of the upstream signal amplifier U-AMP3 in order to reduce cross-talk the bridge B is open.

In this embodiment, in order to reduce the cross-talk at the region of the internal transmission line at a subscriber terminal, the personal computer PC is chosen as this subscriber terminal.

A portion of the downstream signal is provided to each subscriber residence and further to each subscriber terminal. In this way a portion of the downstream signal is provided to the subscriber residence R3 and further to the personal computer PC.

Due to the external signal power attenuation of the external network and the internal signal power attenuation of the internal network i.e. subscriber residence R3 in-house network, the portion of the power level of the downstream signal (not shown) received in the personal computer PC becomes low compared with the power level of the upstream signal US generated by the personal computer PC.

This difference in power makes the region of the transmission line at the personal computer PC sensitive to cross-talk. However, by including the upstream signal amplifier U-AMP3 in the termination unit TU and by amplifying the upstream signal US with the upstream gain value UG, the required power level of the transmitted upstream signal US at the personal computer PC is allowed to be smaller. The difference in power level becomes smaller and the region of the transmission line at the personal computer PC is less sensitive to cross-talk. The upstream gain value UG is in fact a compensation for the upstream signal power attenuation of the internal transmission line coupled between the personal computer PC and the termination unit TU. This will become more clear in the following paragraphs.

The subscriber terminals of the subscriber residence R3 are designed to be able to transmit an upstream signal US to the central station CS with a powerbudget within a predetermined power level range in order to overcome the end-to-end upstream signal power attenuation along the transmission path from the residence R3 to the central station CS. This end-to-end signal power attenuation is the sum of the external upstream signal power attenuation UA-Le with the internal upstream signal power attenuation UA-Li minus the upstream gain value UG of the upstream signal amplifier:

$$UA\text{-}Le + UA\text{-}Li - UG$$

In this embodiment the internal transmission line Li (see the bold line in the figure) coupled between the set-top box STB and the termination unit TU is chosen to serve as a means for measurement of the internal upstream signal power attenuation UA-Li. However, it has to be remarked that any of the subscriber terminals could have been chosen to have a means for measuring for the internal upstream signal power attenuation.

The power level of the upstream signal which is received at the central station CS will become too low when this end-to-end signal power attenuation exceeds a maximum allowed signal power attenuation. This maximum allowed signal power attenuation is the signal power attenuation according to the upper limit of the predetermined power level range of above. In other words, for each subscriber terminal, the end-to-end signal power attenuation must be smaller than the maximum allowed signal power attenuation:

$$UA\text{-}Le + UA\text{-}Li - UG \leftarrow UA\text{-}Le\text{-MAX} + UA\text{-}Li\text{-MAX} - UG\text{-MAX}$$

As already explained above, each time a new subscriber terminal is installed, the internal upstream signal power attenuation UA-Li should be determined again. Therefore a maximum expected internal upstream signal power attenuation is defined as UA-Li-MAX. So, the rule becomes:

$$UA\text{-}Le + UA\text{-}Li\text{-MAX} - UG \leftarrow UA\text{-}Le\text{-MAX} + UA\text{-}Li\text{-MAX} - UG\text{-MAX}$$

and $$UA\text{-}Le - UG \leftarrow UA\text{-}Le\text{-MAX} - UG\text{-MAX}$$

Now, presume that at installation time of the termination unit TU at residence R3, this residence R3 is located in the telecommunication network at a place where the external signal power attenuation UA-Le is small, the above rule can be easily respected. The upstream signal amplifier is not needed UG=0 and the bridge B remains closed:

$$UA\text{-}Le - 0 \leftarrow UA\text{-}Le\text{-MAX} - UG\text{-MAX}$$

However, when this residence R3 is located in the telecommunication network at a place where the external signal power attenuation UA-Le is big, the above rule cannot be respected anymore:

$$UA\text{-}Le > UA\text{-}Le\text{-MAX} - UG\text{-MAX}$$

The bridge B must be opened and the upstream signal amplifier UA compensates the difference:

$$UG = (UA\text{-}Le) - (UA\text{-}Le\text{-MAX} - UG\text{-MAX})$$

and the rule is again respected:

$$UA\text{-}Le - UG \leftarrow UA\text{-}Le\text{-MAX} - UG\text{-MAX}$$

In fact, the new external upstream signal power attenuation equals the difference between the maximum external upstream signal power attenuation UA-Le-MAX and the maximum upstream gain value UG-MAX:

$$(UA\text{-}Le)\ \text{new} = UA\text{-}Le\text{-MAX} - UG\text{-MAX}$$

By making the upstream gain value UG a function of the external upstream signal power attenuation UA-Le, the extra power budget needed to overcome the upstream signal power attenuation of the end-to-end transmission line is provided by the upstream signal amplifier UA.

In this embodiment no remote automatic gain control is installed. But, it has to be remarked that it is obvious to a person skilled in the art to implement such a system. The steps to be realized for an automatic control system are, e.g.:

a) determining at set times the external upstream signal power attenuation UA-Le by sending an upstream test signal with a predetermined power level from the termination unit TU to the central station CS and by measuring the power of the received upstream test signal at the central station CS; the difference between these two powerlevels is a measure for the external upstream signal power attenuation UA-Le;

b) using this external upstream signal power attenuation UA-Le to control the upstream gain UG of the upstream signal amplifier UA.

It has to be remarked that although in this embodiment the different subscriber terminals i.e. the personal computer PC, the telephone set TEL, the television set TV and the set-top box STB, are all coupled to one port i.e. the second port P2 of the termination unit TU included in the subscriber residence R3, the present invention is not restricted to subscriber residences where such a choice is made, but that the different subscriber terminals also can be coupled via different ports to the termination unit TU.

It also has to be remarked that although in this embodiment reducing the cross-talk in the region of the transmission line at the personal computer PC is chosen, this choice of subscriber terminal has no influence on the scope of the invention. By including the upstream signal amplifier the cross-talk in the region of the transmission line at the other subscriber terminals is also reduced and the description of this embodiment can easily be adapted to explain the working of the upstream signal amplifier regarding the other subscriber terminals.

In addition, although in this embodiment the included subscriber terminals are a personal computer PC, a telephone set TEL, a television set TV and set-top box STB the invention is not restricted to these kinds of subscriber terminals.

Moreover, it should be noted that, although the above described telecommunication network is a hybrid fiber coax network HFC, the application of the present invention is not restricted to such networks. Small modifications, evident to a person skilled in the art, may be applied to the above described embodiment to adapt it to be integrated in other bi-directional distributed networks where a growing signal power attenuation of a growing in-house network brings about cross-talk in the region of the transmission line at the subscriber terminals. For instance ADSL (Asymmetric Digital Subscriber Line) which reuses the copper twisted pair that is used in telephone networks worldwide and where the interactive i.e. bidirectional aspect becomes more and more important.

Finally it has to be remarked that although in this embodiment only the upstream working of the upstream signal amplifier is explained, the invention is not restricted to applications of an upstream signal amplifier but the above described embodiment can be adapted with small modifications, evident to a person skilled in the art, to explain the use of a downstream amplifier. For instance, with reference to the amplifier U-AMP3 of the sole FIGURE, the illustrated direction thereof can be any of the upstream or downstream directions.

While the principles of the invention have been described above in connection with specific apparatus, it is to be clearly understood that this description is made only by way of example and not as a limitation on the scope of the invention.

What is claimed is:

1. A method for use in a telecommunication network wherein a central station is coupled to a plurality of residences, one of said residences including a termination unit coupled to said central station via a first port, said residence including at least one subscriber terminal coupled to said termination unit via a second port, characterized in that said method includes the steps of:

amplifying an upstream signal applied to said second port with an upstream gain value by means of an upstream signal amplifier included in said termination unit, and generating an amplified upstream signal provided to said first port, and further characterized in that said upstream gain value is for compensating any of:

an upstream signal power attenuation of an internal transmission line coupled between said termination unit and any of said subscriber terminals; and a downstream signal power attenuation of said internal transmission line, and still further characterized in that the upstream gain value is selected so that the at least one subscriber terminal will be in a region having a smaller difference between upstream and downstream signal power levels and a smaller difference between downstream and upstream signal power levels.

2. The method according to claim 1, characterized in that said method further includes the step of determining said upstream gain value as a function of any of an upstream signal power attenuation of an external transmission line coupled between said first port of said termination unit and said central station and a downstream signal power attenuation of said external transmission line.

3. The method according to claim 2, characterized in that said method further includes the steps of:

determining at set times the value of said upstream signal power attenuation of said external transmission line or the value of said downstream signal power attenuation of said external transmission line, respectively;

providing said value to said control unit to thereby enable said control unit to determine said upstream gain control signal.

4. The method according to claim 1, characterized in that said method further includes the step of controlling said upstream gain value by means of an upstream gain control signal provided from a control unit included in said termination unit to said upstream signal amplifier.

5. A method for use in a telecommunication network wherein a central station is coupled to a plurality of residences one of said residences including a termination unit coupled to said central station via a first port, said residence including at least one subscriber terminal coupled to said termination unit via a second port, characterized in that said method includes the steps of amplifying a downstream signal applied to said first port with a downstream gain value by means of a downstream signal amplifier included in said termination unit and generating an amplified downstream signal provided to said second port and that said downstream gain value is for compensating any of:

an upstream signal power attenuation of the internal transmission line coupled between said termination unit and any of said subscriber terminals; and a downstream signal power attenuation of said internal transmission line, and still further characterized in that the gain value is selected so that the at least one subscriber terminal will be in a region having a smaller difference between upstream and downstream signal power levels and a smaller difference between downstream and upstream signal power levels.

6. A method according to claim 5, characterized in that said method further includes controlling said downstream gain value by means of a downstream gain control signal provided from a control unit included in said termination unit to said downstream signal amplifier.

7. A method according to claim 5, characterized in that said method further includes the step of determining said downstream gain value as a function of any of an upstream signal power attenuation of an external transmission line coupled between said first port of said termination unit and said central station and a downstream signal power attenuation of said external transmission line.

8. A method according to claim 7, characterized in that said method further includes:

determining at set times the upstream signal power attenuation of said external transmission line or the value of said downstream signal power attenuation of said external transmission line; and providing said value to said control unit to thereby enable said control unit to determine said downstream gain control signal based thereon.

9. The method of claim 5, characterized in that said method further includes the step of controlling said downstream gain value by means of a downstream gain control signal provided from a control unit included in said termination unit to said downstream signal amplifier.

10. Termination unit for inclusion in a telecommunication network wherein a central station is coupled to a plurality of residences, one of said residences including said termination unit coupled to said central station via a first port of said termination unit, said residence including at least one subscriber terminal coupled to said termination unit via a second port, characterized in that:

said termination unit includes an upstream signal amplifier to amplify an upstream signal applied to said second port with an upstream gain value and to thereby generate an amplified upstream signal provided to said first port, and further characterized in that said upstream gain value compensates any of:

the upstream signal power attenuation of the internal transmission line coupled between said termination unit and any of said subscriber terminals; and the downstream signal power attenuation of said internal transmission line, and still further characterized in that the upstream gain value is selected so that the at least one subscriber terminal will be in a region having a smaller difference between upstream and downstream signal power levels and a smaller difference between downstream and upstream signal power levels.

11. Termination unit according to claim 10, for inclusion in a telecommunication network wherein a central station is coupled to a plurality of residences, one of said residences including said termination unit coupled to said central station via a first port of said termination unit, said residence including at least one subscriber coupled to said termination unit via a second port, characterized in that said termination unit includes a downstream signal amplifier to amplify a downstream signal applied to said first port with a downstream gain value and to thereby generate an amplified downstream signal provided to said second port and that said downstream gain value compensates any of:

the upstream signal power attenuation of the internal transmission line coupled between said termination unit and any of said subscriber terminals; and the downstream signal power attenuation of said internal transmission line.

12. A telecommunication network characterized in that said telecommunication network includes at least one termination unit as described in claim 11.

13. A telecommunication network characterized in that said telecommunication network includes at least one termination unit as described in claim 10.

* * * * *